(12) United States Patent
Wang et al.

(10) Patent No.: US 10,579,118 B2
(45) Date of Patent: Mar. 3, 2020

(54) DETECTION CIRCUITS

(71) Applicant: HEWLETT-PACKARD DEVELOPMENT COMPANY, L.P., Houston, TX (US)

(72) Inventors: Po-Lan Wang, Taipei (TW); Jen-Chun Hsu, Taipei (TW); Yi-Feng Lin, Taipei (TW)

(73) Assignee: Hewlett-Packard Development Company, L.P., Spring, TX (US)

( * ) Notice: Subject to any disclaimer, the term of this patent is extended or adjusted under 35 U.S.C. 154(b) by 206 days.

(21) Appl. No.: 15/748,414

(22) PCT Filed: Jan. 6, 2016

(86) PCT No.: PCT/US2016/012328
§ 371 (c)(1),
(2) Date: Jan. 29, 2018

(87) PCT Pub. No.: WO2017/119876
PCT Pub. Date: Jul. 13, 2017

(65) Prior Publication Data
US 2018/0224912 A1   Aug. 9, 2018

(51) Int. Cl.
*G06F 1/26* (2006.01)
*G06F 1/30* (2006.01)
(Continued)

(52) U.S. Cl.
CPC ........... *G06F 1/266* (2013.01); *G06F 1/28* (2013.01); *G06F 1/305* (2013.01); *G06F 13/24* (2013.01);
(Continued)

(58) Field of Classification Search
CPC . G06F 1/266; G06F 1/28; G06F 1/305; G06F 13/24; G06F 13/38; G06F 13/40; G06F 13/4282; G06F 2213/0042
See application file for complete search history.

(56) References Cited

U.S. PATENT DOCUMENTS

| 6,516,418 B1 | 2/2003 | Lee |
| 6,946,904 B1 | 9/2005 | Varma et al. |

(Continued)

FOREIGN PATENT DOCUMENTS

| CN | 102820639 A | 12/2012 | |
| WO | WO-2013015938 | 1/2013 | |
| WO | WO-2016043693 A1 * | 3/2016 | ........... G06F 13/385 |

OTHER PUBLICATIONS

Webpage ~ "Defending Against Malicious USB Firmware with GoodUSB" ~ http://davejingtian.org ~ Dec. 2015 ~ 5 pages.
(Continued)

*Primary Examiner* — Aurel Prifti
(74) *Attorney, Agent, or Firm* — Brooks Cameron & Huebsch PLLC

(57) ABSTRACT

Example implementations relate to detection circuits. In one example, a detection circuit includes a power supply, a transistor coupled to the power supply, a port coupled via the transistor to the power supply, where the port is to transmit power received via the transistor from the power supply to a corresponding port included in an external device when the corresponding port is coupled to the port, and a detection circuit to detect a voltage between the port and the corresponding port when the port is coupled to the corresponding port and interrupt, via the transistor, power supplied to the port when the detected voltage satisfies a threshold voltage.

13 Claims, 3 Drawing Sheets

(51) Int. Cl.
*G06F 13/40* (2006.01)
*G06F 13/38* (2006.01)
*G06F 1/28* (2006.01)
*G06F 13/24* (2006.01)
*G06F 13/42* (2006.01)

(52) U.S. Cl.
CPC .............. *G06F 13/38* (2013.01); *G06F 13/40* (2013.01); *G06F 13/4282* (2013.01); *G06F 2213/0042* (2013.01)

(56) References Cited

U.S. PATENT DOCUMENTS

| | | | |
|---|---|---|---|
| 8,385,036 B2 | 2/2013 | Koch | |
| 8,982,520 B2 | 3/2015 | Predtetchenski et al. | |
| 9,081,911 B2 | 7/2015 | Powers et al. | |
| 9,170,914 B2* | 10/2015 | Markel | G06F 13/4081 |
| 9,400,546 B1* | 7/2016 | Agarwal | G06F 1/266 |
| 2008/0062586 A1* | 3/2008 | Apfel | H04L 12/10 361/18 |
| 2008/0140887 A1* | 6/2008 | Gallant | G06F 13/4081 710/100 |
| 2009/0102429 A1* | 4/2009 | Xu | H02J 7/0077 320/162 |
| 2009/0109587 A1* | 4/2009 | Smith | H02H 3/202 361/86 |
| 2010/0073837 A1 | 3/2010 | Predtetchenski et al. | |
| 2010/0165528 A1 | 7/2010 | Chan | |
| 2011/0242867 A1* | 10/2011 | Wang | H02M 7/48 363/131 |
| 2012/0204043 A1* | 8/2012 | Hamasaki | G03G 15/5004 713/320 |
| 2012/0212189 A1* | 8/2012 | Shen | H02J 7/0077 320/164 |
| 2013/0151881 A1* | 6/2013 | Chen | G06F 1/3296 713/323 |
| 2014/0111030 A1* | 4/2014 | Chou | G05F 1/10 307/130 |
| 2014/0211351 A1* | 7/2014 | Shoykhet | H02H 3/20 361/86 |
| 2015/0032934 A1* | 1/2015 | Jhong | G06F 1/266 710/316 |
| 2015/0095714 A1* | 4/2015 | Huang | G06F 11/26 714/43 |
| 2015/0160187 A1* | 6/2015 | Gofman | G01N 33/48792 436/95 |
| 2016/0349292 A1* | 12/2016 | Atkinson | G06F 1/28 |

OTHER PUBLICATIONS

Webpage ~ "How do I test a USB drive to be sure it is not a USB killer" ~ http://electronics.stackexchange.com ~ 2015 ~ 3 pages.
Webpage ~ "Is There Any Way to Safely Examine the Contents of a USB Memory Stick?" ~ http://security.stackexchange.com ~ Dec. 2015 ~ 7 pages.
International Searching Authority., International Search Report and Written Opinion dated Sep. 23, 2016 for PCT Application No. PCT/US2016/012328 Filed Jan. 6, 2016, 13 pgs.

* cited by examiner

DETECTION CIRCUITS

BACKGROUND

Computing devices such as laptop computers, desktop computers, tablets, servers, and/or other types of computing devices may include ports to communicate with and/or provide power to external devices that can be coupled to the ports. For example a port may be a universal serial bus (USB) port, among other types of ports.

DETAILED DESCRIPTION

Ports of computing devices can include universal serial bus ports (USB), among other types of ports. External devices can couple to a port of the computing device to communicate with a computing device. For example, power and/or information can be exchanged between a port of the computing device (e.g., a female port) and a corresponding port of an external device (e.g., a male port).

Ports may be subject to attack by nefarious entities. For example, an external device may apply a higher than anticipated voltage and/or current to a port. For instance, a "USB Killer" is an external device that can couple a universal serial bus port or other port of a computing device and generate a voltage outside the designed operational voltage of the port. As a result, the port and/or the computing device may be destroyed or otherwise malfunction. While some computing devices may include various protection mechanisms (e.g., electrostatic protection of data lines and/or a positive thermal coefficient (PTC) these protection mechanisms do not address the above attacks to ports.

Accordingly, examples of the disclosure include detection circuits and methods and computing systems employing detection circuits. In an example, a detection circuit includes a power supply, a transistor coupled to the power supply, a port coupled via the transistor to the power supply, where the port is to transmit power received via the transistor from the power supply to a corresponding port included in an external device when the corresponding port is coupled to the port, and a detection circuit to detect a voltage between the port and the corresponding port when the port is coupled to the corresponding port and interrupt, via the transistor, power supplied to the port when the detected voltage satisfies a threshold voltage. Desirably, detections circuits can detect a voltage between the port and the corresponding port and interrupt power supplied to the port when the detected voltage satisfies a threshold voltage, as detailed herein, to prevent and/or mitigate attacks to ports.

Figure 1:
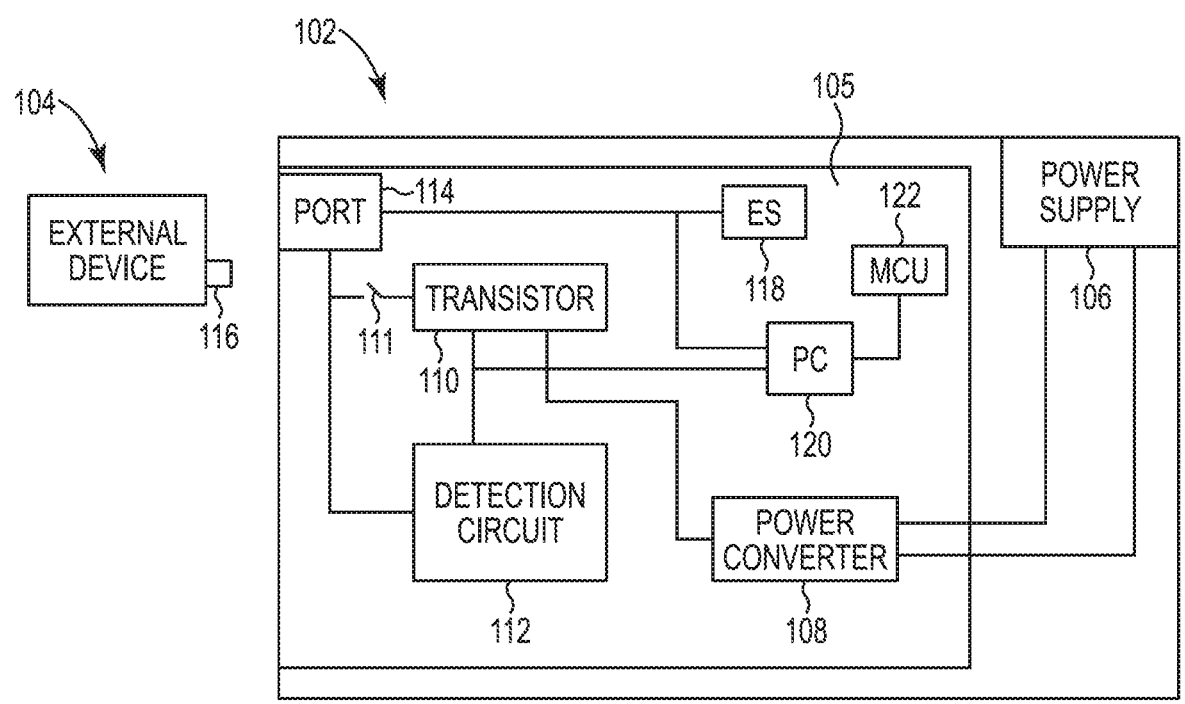
FIG. 1 is a block diagram an example of a computing device including a detection circuit according to the disclosure.

FIG. 1 is a block diagram an example of a computing device 102 including a detection circuit according to the disclosure. The computing device 102 is a computing device that can communicate electronic data and includes a port to couple to an external device, as described herein. Examples of computing devices include desktop and/or laptop computers, phones, tablets, servers, among other types of computing devices.

As illustrated in FIG. 1, the computing device 102 can include a printed circuit board 105, a power supply 106, a power converter 108, a transistor 110, a port, an electrostatic discharge (ES) 118, a platform controller hub (PC) 120, a microcontroller unit (MCU) 122. As described herein, the port 114 is to couple to a corresponding port 116 included in an external device 104. As described herein, the external device 104 and the computing device 102 are separate and distinct devices. In some examples, the port 114 can be a female USB port and the corresponding port 116 can be a male USB port.

The printed circuit board 105 refers to a substrate that mechanically supports and electrically connects electronic components using conductive tracks, pads and other features etched from copper sheets laminated onto a non-conductive substrate. For instance, the transistor 110, the detection circuit 112, and the port 114, among other components as illustrated in FIG. 1, are mounted on the PCB 105.

The power supply 106 refers to a device capable of outputting power. The power supply 106 can be integral in the computing device 102 and/or can be coupled the computing device 102. Examples of power supplies include power supply units (PSU)s, various types of batteries and/or adaptors, voltage regulator modules (VRM), and/or voltage regulator downboard (VRD)s, among other types of suitable power supplies. The power supply 106 can supply a fixed amount of power such as a fixed voltage (e.g., 12 volts, among other possible voltages) and/or the power supply 106 can supply a variable amount of power such as a variable voltage. In any case, the power supply can provide power to the computing device 102.

For instance, in some examples, the power supply 106 can supply power to the power converter 108. The power converter 108 can convert an amount of power (e.g., twelve volts) supplied by the power supply 106 to another amount of power (e.g., five volts). However, the disclosure is not so limited. That is, the computing device 102 can, in some examples, receive power directly from the power supply 106 without a power converter.

The transistor 110 can receive power from the power converter 108 and/or the power supply 106. For example, the transistor 110 can be coupled to a voltage output (not shown) of the port 114 to supply the power from the power supply 106 and/or the power convertor 108 via the voltage output of the port 114 to the corresponding port 116 of the external device 104. The voltage output can correspond to a particular pin of a port such as a particular pin of a USB port. Similarly, a ground (not shown) of the port 114 can correspond to a different pin (different than a voltage output pin) of the USB port 114. It is noted, that a nefarious external device may attempt communicate power (e.g., an amount that satisfies the threshold voltage) via the voltage output and/or a ground of the port 114 in an effort to attack the computing device 102, as described herein.

The transistor includes switching circuitry 111 capable of interrupting, altering a path of, and/or otherwise adjusting power supplied from the transistor 110 to the port 114. For example, the transistor can interrupt power supplied to the port 114 by electrically opening, latching, and/or otherwise ceasing flowing of power to the external device 104, as illustrated in FIG. 1, such that the external device does not receive power from the computing device 102. Alternatively, the transistor 110 can permit power supplied from the power supply 106 to be supplied to the port 114 by closing (i.e., shorting) and thereby permitting power from the power supply 106 to flow though the transistor 110 to the port 114.

The transistor 110 can be a metal-oxide-semiconductor-field-effect transistor (MOSFET), a bipolar junction transistor (BJT), an integrated circuit (IC), among other suitable types of transistors such as those including switches and/or relays to promote detection circuits, as described herein. In some examples, the transistor 110 can have a power rating (e.g., twenty volts) that is comparatively higher than a threshold voltage (e.g., six and a half volts), as described herein. In this manner, the transistor 110 can act withstand attacks by an external device and promote use of detection circuits (e.g., interrupt power supplied to the port when the detected voltage satisfies a threshold voltage), as described herein.

While FIG. 1 illustrates a single transistor 110 and a single port 114, the disclosure is not so limited. That is, the transistor 110 and the port 114 represent a number of switches and/or ports. For example, the transistor 110 can be coupled to a plurality of ports (e.g., two or more USB ports) and control power to each port of the plurality of ports, among other possibilities. In some examples, a single transistor can be coupled to and control power to a plurality of ports.

The transistor 110 can provide power received from the power converter 108 and/or the power supply 106 to the port 114. The port can be a USB port and/or a secure digital (microSD) port that can communicate with and power an external device, among other types of ports. Examples of USB ports include USB 2.0, USB 3.0, and microUSB ports, among other types of USB ports. The port includes data circuitry and power circuitry. The data circuitry can exchange information (e.g., send and/or receive information) with the external device. The power circuitry can power an external device. The power circuitry can include a ground and a power output to output power received by the transistor 110 to an external device. Power supplied to the power output can be variable and controlled by the computing device 102. For example, the detection circuit 112 can control power supplied to the port 114 and therefore control power supplied to the power output of the port 114.

In various examples, the detection circuit 112 can detect a voltage between the port 114 and the corresponding port 116 when the port 114 is coupled to the corresponding port 116. That is, the detection circuit 112 is coupled to a ground and/or the voltage output 115 of the port 114 to promote detection of a voltage between the port and the corresponding port 116.

For instance, detection can occur in response to coupling the port 114 to the corresponding port 116. Put another way, detection can occur in response to coupling the corresponding port 116 to the port 114. However, the disclosure is not so limited. Rather, detection can occur in response to an external device being supplied power (e.g., via the port), in response to the external device communicating power to the computing device, as described herein, continuously or near continuously while computing device and external device are coupled, and/or in response to a user input (e.g., a user input received in response to notification such as those described herein), among other possibilities.

In various examples, the detection circuit 112 can interrupt, via the transistor 110, power supplied to the port 114 when the detected voltage satisfies a threshold voltage. For instance, the external device 104 can communicate power via the corresponding port to the port and can, in some examples, communicate an amount of power that satisfies (e.g., in excess of) the threshold voltage in an effort to damage the port 114 and/or otherwise compromise the computing device 102.

The detection circuit can detect a voltage directly and/or indirectly. Directly detecting a voltage can refer to measuring a voltage potential difference. Indirectly detecting the voltage can refer to detecting a current (e.g., detecting current via a current shunt) and calculating a voltage based on the detected current, among other possibilities. In any case, a voltage can be detected by the detection circuit 112 and compared to a threshold voltage. A threshold voltage refers to a positive threshold and/or negative threshold that can form an operational voltage and/or an operational voltage range (e.g., from a negative threshold to a positive threshold) of the computing device 102. For instance, the detection circuit can detect a voltage (e.g., ten volts) between the port 114 and the corresponding port 116 and interrupt, via the transistor 110, power supplied to the port 114 when the detected voltage satisfies a positive threshold voltage (e.g., seven volts). The positive threshold voltage can be equal to or greater than a desired operational voltage (e.g., five volts), among other possibilities. Similarly, a negative threshold voltage can be equal to or less than a desired operational voltage (e.g., negative five volts), among other possibilities.

The ES 118 refers to a component including circuitry to mitigate voltage spikes (e.g., voltages above an intended operating voltage) such as those that may be experienced upon coupling a power supply of the computing device to a power source, the external device, and/or USB data lines. The MCU 122 refers to a processor resource such as those described herein. The MCU can, in some examples, facilitate aspects of detection circuits, as described herein. For instance, the MCU 122 can promote identifying information associated with the external device coupled to the port of the device and/or interruption, via a transistor included in the computing device, of power supplied from the port to the corresponding port when the detected amount of power satisfies a voltage threshold, among other items including those described herein.

Figure 2:
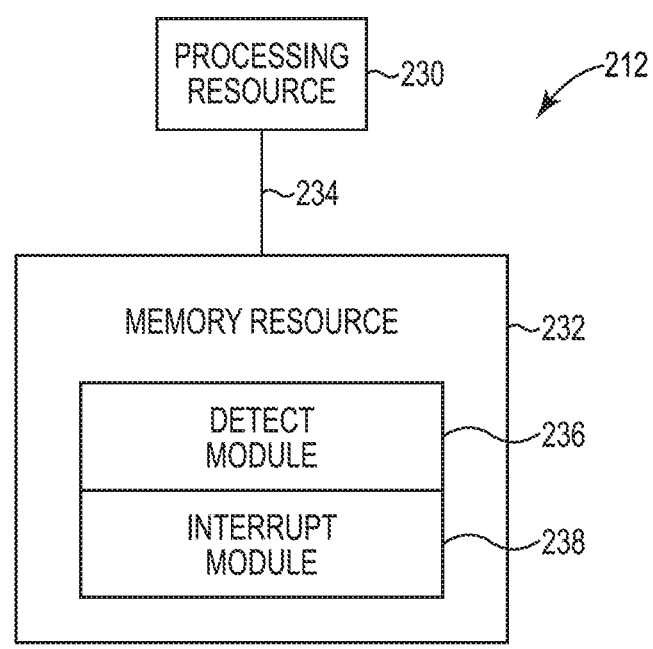
FIG. 2 illustrates an example of a detection circuit according to the disclosure.

As described in greater detail with respect to FIG. 2, the detection circuit 112 can include a processing resource in communication with a memory resource. That is, the detection circuit 112 is analogous to detection circuit 212 as referenced by FIG. 2.

FIG. 2 illustrates an example of a detection circuit according to the disclosure. The detection circuit 212 can include a processing resource 230 in communication with a memory resource 232. The memory resource 232 can include a set of instructions, executable by the processing resource 230 to perform a number of functions described herein.

The detection circuit 212 can utilize software, hardware, firmware, and/or logic to perform a number of functions. The detection circuit can be a combination of hardware and program instructions to perform a number of functions (e.g., actions). For instance, in some examples the detection circuit 212 can include an application specific integrated circuit (ASIC). The hardware, for example, can include a processing resource 230 and a memory resource 232, such as a machine-readable medium (MRM) and/or other memory resource.

The memory resource can be internal and/or external to the detection circuit 212 (e.g., the detection circuit can include an internal memory resource and/or have access to an external memory resource). The program instructions (e.g., machine-readable instructions (MRI)) can include instructions stored on the MRM to implement a particular function. The set of MRI can be executable by the processing resource 230. The memory resource 232 can be coupled to the detection circuit 212 in a wired and/or wireless manner. For example, the memory resource 232 can be an internal memory, a portable memory, a portable disk, and/or a memory associated with another resource (e.g., enabling MRI to be transferred and/or executed across a network such as the Internet).

Memory resource 232 is non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, optical discs, digital versatile discs (DVD), Blu-ray discs (BD), compact discs (CD), and/or a solid state drive (SSD), etc., as well as other types of machine-readable media.

The processing resource 230 can be coupled to the memory resource 232 via a communication path 234. The communication path 234 can be local or remote to the detection circuit 212. Examples of a local communication path 234 can include an electronic bus internal to a machine, where the memory resource 232 can be in communication with the processing resource 230 via the electronic bus. Examples of such electronic buses can include Industry Standard Architecture (ISA), Peripheral Component Interconnect (PCI), Advanced Technology Attachment (ATA), Small Computer System Interface (SCSI), USB, among other types of electronic buses and variants thereof. The communication path 234 can be such that the memory resource 232 is remote from the processing resource 230, such as in a network connection between the memory resource 232 and the processing resource 230. That is, the communication path 234 can be a network connection. Examples of such a network connection can include local area network (LAN), wide area network (WAN), personal area network (PAN), and the Internet, among others.

As shown in FIG. 2, the MRI stored in the memory resource 232 can be segmented into a number of modules 236, 238 that when executed by the processing resource 230 can perform a number of functions including those described herein. That is, as used herein a module includes a set of instructions included to perform a particular task or action. The number of modules 236, 238 can be sub-modules of other modules. For example, a detect module 236 can be a sub-module of an interrupt module 238 and/or the detect module 236 and the interrupt module 238 can be contained within a single module. Furthermore, the number of modules 236, 238 can comprise individual modules separate and distinct from one another. Examples are not limited to the specific modules 236, 238 illustrated in FIG. 2.

The detection circuit 212 can detect a voltage between a port of a computing device and a corresponding port of an external device when the port is coupled to the corresponding port and can interrupt, via a transistor, power supplied to the port when the detected voltage satisfies a threshold voltage. As used herein, a corresponding port refers to a port of a type that is suitable to couple to a port. In various examples, the port and the corresponding port can be complimentary components of a particular type of port such as a USB port. For example, the detection circuit 212 can include a detect module 236, which can detect an amount of voltage provided from a male USB port of an external device to a female USB port of a computing device when the male USB port is coupled to the female USB port.

The interrupt module 238 can interrupt, via a transistor included in the computing device, power supplied from a power supply of the computing device via the transistor and the female USB port to the external device when the detected amount of power satisfies a voltage threshold (e.g., an absolute voltage threshold). As used herein, a detected voltage can satisfy a threshold voltage when a value of the detected voltage is comparatively greater than or equal to a value of the threshold voltage (e.g., a positive threshold) and/or is comparatively less than or equal to a value of a threshold voltage (e.g., a negative threshold).

In some examples, the memory resource 232 can include a variance module to vary a threshold voltage. That is, in various examples, a threshold voltage can be variable. A threshold voltage be a specified value (e.g., six volts) and/or can be a function of a desired operating power of a computing device (e.g., equal to 1.15*a desired operating power of a computing device). A threshold voltage can be set for each port of a plurality of ports included in a device and/or a global threshold voltage can be set for every port of a plurality of ports included in a device.

As mentioned, a threshold voltage can be greater than and/or less than a desired operating power. For instance, in some examples, a threshold voltage can be a value that is comparatively greater than a desired operating power of a computing device and/or a port included in a computing device. For example, a device can include a USB port with a desired operating power of five volts. In such an example, a threshold voltage can be a value that is comparatively greater than five volts. Similarly, in some examples, a threshold voltage can be a value that is comparatively less than a desired operating power of a computing device and/or a port included in a computing device.

Figure 3:
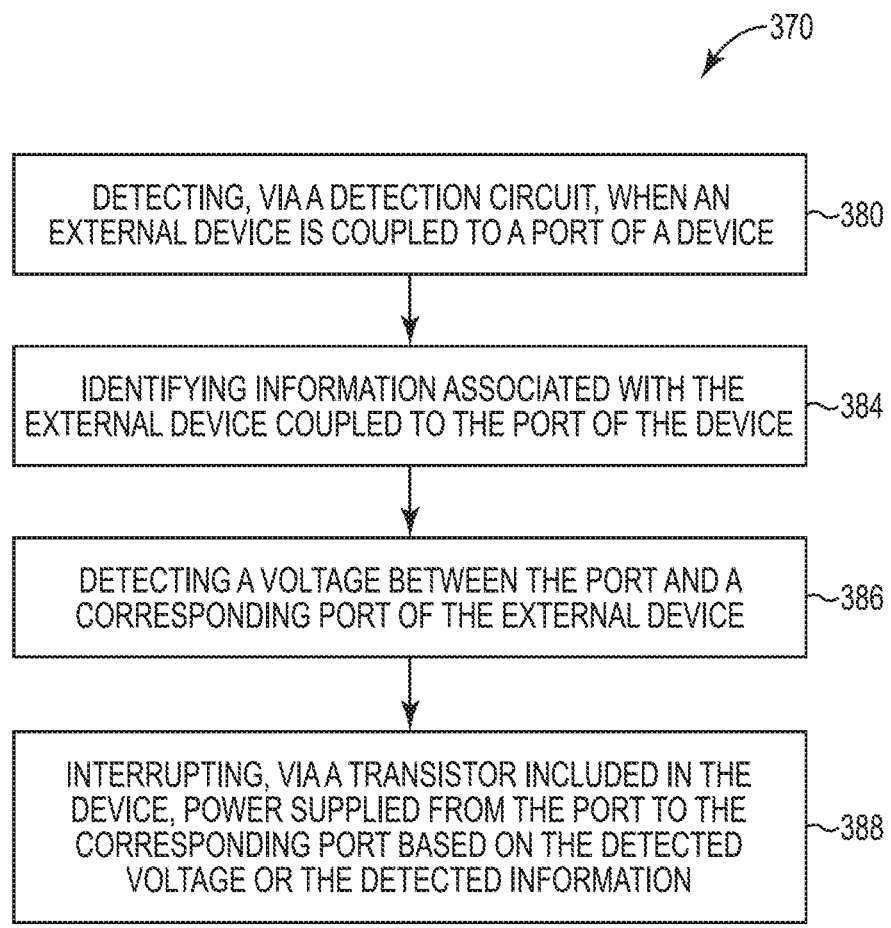
FIG. 3 is a flow chart illustrating an example of a method employing detection circuits according to the disclosure.

FIG. 3 is a flow chart illustrating an example of a method 370 employing detection circuits according to the disclosure. At 380, the method 370 can include detecting, via a detection circuit, when an external device is coupled to a port of a device. As mentioned, detection can occur in response a port of a device being coupled to a corresponding port of an external device and or following coupling of an external device to a port of the device (e.g. continuously and/or at any time when coupled to the device), among other possibilities.

At 384, the method 370 can include identifying information associated with the external device coupled to the port of the device. Such identification can occur in response to detection, as described at 380, and/or following coupling of an external device to a port of the device (e.g. continuously and/or at any time when coupled to the device). For example, identification can occur upon in response to detection of a port of a device being coupled to a corresponding port of an external device. However, the disclosure is not so limited. Rather, identifying information and/or detection as described at 380 can occur upon a system restart, power-on, and/or a system resume (e.g., resuming from a sleep state such as an Advanced Configuration and Power Interface ACPI sleep state S3, S4, etc.), among other possibilities. Information associated with the external device can include a name, make, and/or a model of an external device, among other information (vendor ID, Product ID, USB attribute, max power, device attribute, data type, Rpagesize, payload size, product version, firmware version) associated with the external device.

Stored information associated with the external device may be stored in a memory resource, such as those described with respect to FIG. 2. For instance, a name (i.e., a device identifier) formed of numeric, alpha, and/or alpha numeric characters) stored as stored information that is the same as identifying information associated with an external device coupled to a device can result in permitting continued power delivery to the external device. Enabling can refer to the transistor permitting power from the power supply or otherwise to flow via a port of the device to the external device. Notably, power delivery can be provided directly through a physical coupling of a port and a corresponding port and/or indirectly through indirect coupling of a port and a corresponding port to permit wired and/or wireless delivery of power to the external device.

In some examples, the method 370 can include prompting a user to permit continued power delivery from the port to the corresponding port when the identified information does not match stored information associated with the external device. For instance, when stored information is different than identified information associated with an external device it can be indicative that the external device is new and/or unknown to the device. In such an instance, providing a notification to a user, can promote disabling power supplied to the external device to prevent/mitigate attacks by the external device coupled to a port of a computing device (i.e., a device). The prompt can be provided via a prompt displayed in a graphical user interface of the device, among other possibilities.

A user, in response to a prompt, can provide an input to the device (e.g., selection of a graphical icon, etc.) to permit continued power delivery to the external device and/or provide an input to interrupt power to the external device. That is, in some examples, method 370 can include permitting continued power delivery from the port to the corresponding port based on a response (e.g., to permit power) to the notification. Similarly, in some examples, the method 370 can include interrupting power delivery from the port to the corresponding port (i.e., not delivering power to the external device) based on a response (e.g., to decline power) to the notification.

As shown at 386, the method 370 can include detecting a voltage between the port and the corresponding port of the external device, as described herein. For example, a voltage can be detected directly between the ports and or along a power supply path extending from the transistor and/or the detection circuit and the port (e.g. the female port of the device). In some examples, an operational amplifier (not shown) included in the computing device or other suitable device can facilitate detection of a voltage such as the voltage between the port and the corresponding port and/or comparison of a detected voltage to a threshold. That is, the method can employ an operational amplifier and/or a memory resource, as described herein, to perform various aspects of the method.

The method can include interrupting, via a transistor included in the device, power supplied from the port to the corresponding port based on the detected voltage or the detected information, as shown at 388. For instance, a transistor can interrupt power supplied from the port to the corresponding port based on the detected voltage (e.g., when the detected voltage satisfies a voltage threshold) or the detected information (e.g., when stored information is different than identified information associated with an external device), as described herein.

As used herein, "logic" is an alternative or additional processing resource to perform a particular action and/or function, etc., described herein, which includes hardware, e.g., various forms of transistor logic, ASICs, etc., as opposed to computer executable instructions, e.g., software firmware, etc., stored in memory and executable by a processor. As used herein, "a" or "a number of" something can refer to one or more such things. When an element is referred to as being "on," "connected to", "coupled to", or "coupled with" another element, it can be directly on, connected, or coupled with the other element or intervening elements may be present.

Since many examples can be made without departing from the spirit and scope of the system and method of the disclosure, this specification merely sets forth some of the many possible example configurations and implementations. In the disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

What is claimed:

1. A device, comprising:
    a power supply;
    a transistor coupled to the power supply;
    a port coupled via the transistor to the power supply, wherein the port is to transmit power received via the transistor from the power supply to a corresponding port included in an external device when the corresponding port is coupled to the port; and
    a detection circuit to:
        detect a voltage between the port and the corresponding port when the port is coupled to the corresponding port; and
        interrupt, via the transistor, power supplied to the port when the detected voltage satisfies a threshold voltage;
    wherein the transistor has a power rating that is comparatively higher than the threshold voltage.

2. The device of claim 1, wherein the port is a female universal serial bus (USB) port and the corresponding port is a male USB port.

3. The device of claim 2, wherein the transistor is coupled to a voltage output of the female USB port to supply the power from the power supply via the voltage output of the female USB port to the male USB port of the external device.

4. The device of claim 1, wherein the detection circuit is coupled to a ground and a voltage output of the port.

5. The device of claim 1, wherein the transistor, the detection circuit, and the port are mounted on a printed circuit board of the device.

6. The device of claim 1, wherein the external device is to communicate power via the corresponding port to the port, and wherein the external device is to communicate an amount of power that satisfies the threshold voltage.

7. The device of claim 1, wherein the transistor comprises a metal-oxide-semiconductor-field-effect transistor (MOSFET), a bipolar junction transistor (BJT), or an integrated circuit (IC).

8. A detection circuit, comprising a processing resource in communication with a memory resource, wherein the memory resource includes a set of instructions to:
   detect an amount of voltage provided from a male universal serial bus (USB) port of an external device to a female USB port of a device when the male USB port is coupled to the female USB port; and
   interrupt, via a transistor, power supplied from a power supply of the device via the transistor and the female USB port to the external device when the detected amount of power satisfies a voltage threshold,
   wherein the threshold voltage is variable and the instructions include instructions to vary the threshold voltage to include at least one of a positive voltage threshold and a negative voltage threshold.

9. A method, comprising:
   detecting, via a detection circuit, when an external device is coupled to a port of a device;
   identifying information associated with the external device coupled to the port of the device wherein the information corresponds to a communication via the port and the information comprises an amount of power for the external device that satisfies a threshold voltage;
   detecting a voltage between the port and a corresponding port of the external device;
   and
   interrupting, via a transistor included in the device, power supplied from the port to the corresponding port based on the detected voltage or the detected information.

10. The method of claim 9, wherein identifying includes identifying information associated with the external device that includes a name, a make and a model of the external device.

11. The method of claim 9, including permitting continued power delivery when the identified information matches stored information associated with the external device.

12. The method of claim 9, comprising prompting a user to permit continued power delivery from the port to the corresponding port when the identified information does not match stored information associated with the external device.

13. The method of claim 12, wherein the method includes permitting continued power delivery from the port to the corresponding port based on a response to the notification.

* * * * *